United States Patent [19]

Konitzer

[11] Patent Number: 5,014,648
[45] Date of Patent: May 14, 1991

[54] COW ANTI-KICK APPARATUS, AND METHOD OF USE

[76] Inventor: Frank Konitzer, Rte. 2, Oconto Falls, Wis. 54154

[21] Appl. No.: 302,379

[22] Filed: Jan. 25, 1989

[51] Int. Cl.$^5$ .............................................. A01K 13/00
[52] U.S. Cl. ..................................... 119/105; 119/126; 54/78
[58] Field of Search ................. 119/96, 105, 126, 151; 54/22, 78

[56] References Cited

U.S. PATENT DOCUMENTS

| | | | |
|---|---|---|---|
| 546,999 | 10/1895 | Cunningham | 119/126 |
| 754,033 | 3/1904 | Young | 119/105 |
| 1,012,165 | 12/1911 | Schimke . | |
| 1,047,104 | 12/1912 | Moss | 119/126 |
| 1,047,808 | 12/1912 | Hinkle et al. | 119/105 |
| 1,100,194 | 6/1914 | Palmer . | |
| 1,270,814 | 7/1918 | Grove . | |
| 1,450,774 | 4/1923 | Haering . | |
| 1,458,821 | 6/1923 | Haering . | |
| 1,467,221 | 9/1923 | Anderson . | |
| 1,904,635 | 4/1933 | Trowbridge . | |
| 2,516,744 | 7/1950 | Arends | 24/252 |
| 2,727,493 | 12/1955 | Norenborg | 119/96 |
| 2,740,380 | 4/1956 | Johnson | 119/105 |
| 2,743,701 | 5/1956 | Boyd | 119/126 |
| 2,762,334 | 9/1956 | Allen | 119/96 |
| 2,909,153 | 10/1959 | McKinley et al. | 119/126 |
| 2,954,008 | 9/1960 | Bullard | 119/126 |
| 3,035,546 | 5/1962 | Peters | 119/105 |
| 3,736,906 | 6/1973 | Peterson | 119/105 |

Primary Examiner—John Weiss
Attorney, Agent, or Firm—Thomas D. Wilhelm

[57] ABSTRACT

Anti-kick apparatus for mounting on the hips of a cow, and for effectively discouraging a cow from kicking by holding the root of the tail in an upwardly disposed attitude. The tail is held by a tail holding means which is mounted to a clamping means which grips the hips of the cow.

26 Claims, 3 Drawing Sheets

COW ANTI-KICK APPARATUS, AND METHOD OF USE

BACKGROUND OF THE INVENTION

This invention relates to apparatus for preventing a cow, and especially a milk cow, from kicking an attending person. It is known to provide a variety of cleansing treatments and medical treatments to the udder of a milk cow. It is relatively common for the cow to object to such treatments, particularly when there is any sensitivity to the udder being touched in course of the treatment. Such sensitivity may be encountered with a young animal which has not yet grown accustomed to such touching. Sensitivity may also be encountered in an animal which has an illness, or some physical damage to the udder. In some cases the udder is physically sensitive to touch, particularly where the skin has been damaged, or when the skin or the udder is diseased. In any event, it is common practice that the udder is subjected to certain physical contacts and treatments in the normal handling of the milk cow.

In those cases where the cow is not receptive to touching of the udder, the common action of the cow is to kick. Typically, the kick is upwardly toward the udder, and comprises such as a pushing or shoving motion to prevent the touching of the udder.

The animals caretaker prefers to not be kicked. The cow is much stronger than the person. The hoof is quite hard. And thus the kicking of the cow can impose injury, or at the least an inconvenience and nuisance, to the person caring for the cow.

It is known to hold a cow's tail in order to prevent a cow from switching the tail at the caretaker. A variety of references teach various equipments for attachment to the tail and for then restraining the tail by means of attachment to some other part of the cow, to the caretaker, or to some apparatus in the vicinity of the cow. It is known, for example, to tie a rope to the tail, and to then tie the rope to some joining apparatus such as a piece of the stanchion. It is also known to attach the free end of the rope to the front end of the cow. It is further known to attach the free end of the rope to some overhead device in a barn, such as a pipe or a timber.

It is known to attach to a cow an anti-kick device which pushes in on the cows groin, below the hips. Such a device is shown in U.S. Pat. No. 1,012,165 which applies pressure on the groin and secures the tail, but does not hold the tail up. Thus the control of kicking is by means of the pressure on the groin. U.S. Pat. No. 1,100,194 mounts on the leg of the cow and physically prevents the movement of the legs. U.S. Pat. No. 1,270,814 similarly hobbles the cow. U.S. Pat. No. 3,736,906 holds the tail up to prevent kicking, and anchors it to a neck collar of the stauchion. Similarly U.S. Pat. No. 2,740,380 lifts the tail with a tail embracing member and anchors the rope at the cow's neck.

While the above art addresses the problem of discouraging a cow from kicking, it suffers from a variety of shortcomings. Devices which rely on groin pressure are deficient in that they are not effective to prevent the cow from kicking. Those devices which hobbles the cow prevent the cow from kicking to the extent they stay in place, but the cow can fall down and become severely injured, as well injuring the caretaker. Those devices which anchor the tail of the cow to some immovable object risk danger to the cow should the cow fall down, whereby the tail might sustain injury as it is restrained by the immovable anchor. There is also the deficiency in some of the above equipment in that they are cumbersome to handle and difficult to install.

It is an object of this invention to provide an anti-kick device which effectively discourages a cow from kicking without posing any risk of injury to the cow or to the caretaker.

It is an object of the invention to provide such a device which is easily transportable and is quickly attachable and functionally emplaceable on the cow.

It is a further object of the invention to provide an anti-kick device which is economical to manufacture and durable in use.

SUMMARY OF THE DISCLOSURE

The invention is seen in anti-kick apparatus for mounting on the hips of a cow, the apparatus comprising first and second clamping jaws capable of receiving and gripping a cow's hips, connecting means connecting the clamping jaws to each other, tail holding means mounted to the connecting means, and tightening means extending between the first and second clamping jaws capable of tightening the first and second clamping jaws with respect to a cow's hips. In preferred embodiments of the invention, the connecting means comprises two connecting members, each member extending between the first and second clamping jaws, the connecting members being spaced from each other. The apparatus preferably includes means for changing the distance between the clamping jaws. Where two connecting members are used, they are preferably spaced from each other front to rear on the cow and wherein the tightening means is positioned between the connecting members.

The tail holding means preferably comprises means for rotatably mounting the tail holding means to the connecting means, and includes means for fixing the rotatable mounting means in a given rotational position. In addition, it is preferred that the tail holding means be slidable along the length of the connecting means and include means for fixing the tail holding means at a given position along the length of the connecting means.

The tail holding means preferably includes a support beam, wherein the support beam comprises means for adjusting and fixing the length of the support beam.

The anti-kick apparatus of the invention may also be described as first and second U-shaped clamping jaws, each clamping jaw including a tie bar extending across the U, connecting means comprising two pairs of telescoping members, each pair comprising a first tube member and a second member slidable inside the first tube member, the two pairs being spaced from each other front to rear with respect to a cow, tail holding means mounted to the connecting means, and tightening means extending between the tie bars on the first and second clamping jaws, and capable of tightening the first and second clamping jaws in a direction toward each other. The tail holding means comprises means for rotatably and slidably mounting the tail holding means to the connecting means. A support beam extends from the rotatable and slidable mounting means. The support beam comprises means for adjusting, and fixing the length of the support beam. The tail holding means also includes the tail holder on a support beam remote from the rotatable and slidable mounting means.

In preferred embodiments of the apparatus of the invention, the clamping jaws are disposed such that the portions of the clamping jaws which are disposed toward the front of the cow are closer together than the portions of the clamping jaws that are disposed toward the rear of the cow.

Another way of describing the apparatus of the invention is with respect to its several component parts. In that respect, the first component part comprises a first clamp member comprising a first clamp jaw member, and a first pair of clamp connecting members extending from the first clamp jaw member at an angle to the first jaw member, and generally parallel to each other. The second component part comprises a second clamp member comprising a second clamp jaw member, and a second pair of clamp connecting members extending from the second clamp jaw member at an angle to the second jaw member, and generally parallel to each other, the second pair of clamp connecting members slidably receiving, and joining with, the first pair of clamp connecting members, such that the first and second clamp jaw members extend generally in the same direction from the joined clamp connecting members. The third component is the tightening means extending between the first and second clamp members and capable of tightening the first and second clamp members in a direction toward each other. The fourth component part is the tail holding means rotatably and slidably mounted on one of the second pair of clamp connecting members, and including means for fixing the tail holding means in a given position on the one clamp connecting member; the tail holding means comprising means for rotatable and slidable mounting on the one clamp connecting member, a support beam extending from the rotatable and slidable mounting means, the support beam comprising means for adjusting, and fixing, the length of the support beam, and a tail holder on the support beam remote from the rotatable and slidable mounting means.

The invention also comprises a method of discouraging a cow from kicking. The method comprises mounting on a cow, at the cow's hips, apparatus comprising (i) first and second clamping jaws capable of receiving and gripping a cow's hips, (ii) connecting means connecting the clamping jaws, (iii) tail holding means mounted to the connecting means, and (iv) tightening means extending between the first and second jaws, the mounting including tightening the tightening means and thereby tightening the clamping jaws on the hips of the cow.

The method also comprises slidably and rotatably fixing the position and rotational attitude of the tail holding means with respect to the connecting means.

The method further comprises the step of attaching the tail of the cow, near the base of the tail, to the holding means.

Finally, the method comprises the step of adjusting the slidable and rotational positioning of the tail holding means, as necessary, to hold the tail of the cow in an upwardly directed attitude.

DETAILED DESCRIPTION OF THE ILLUSTRATED EMBODIMENT

Figure 1:
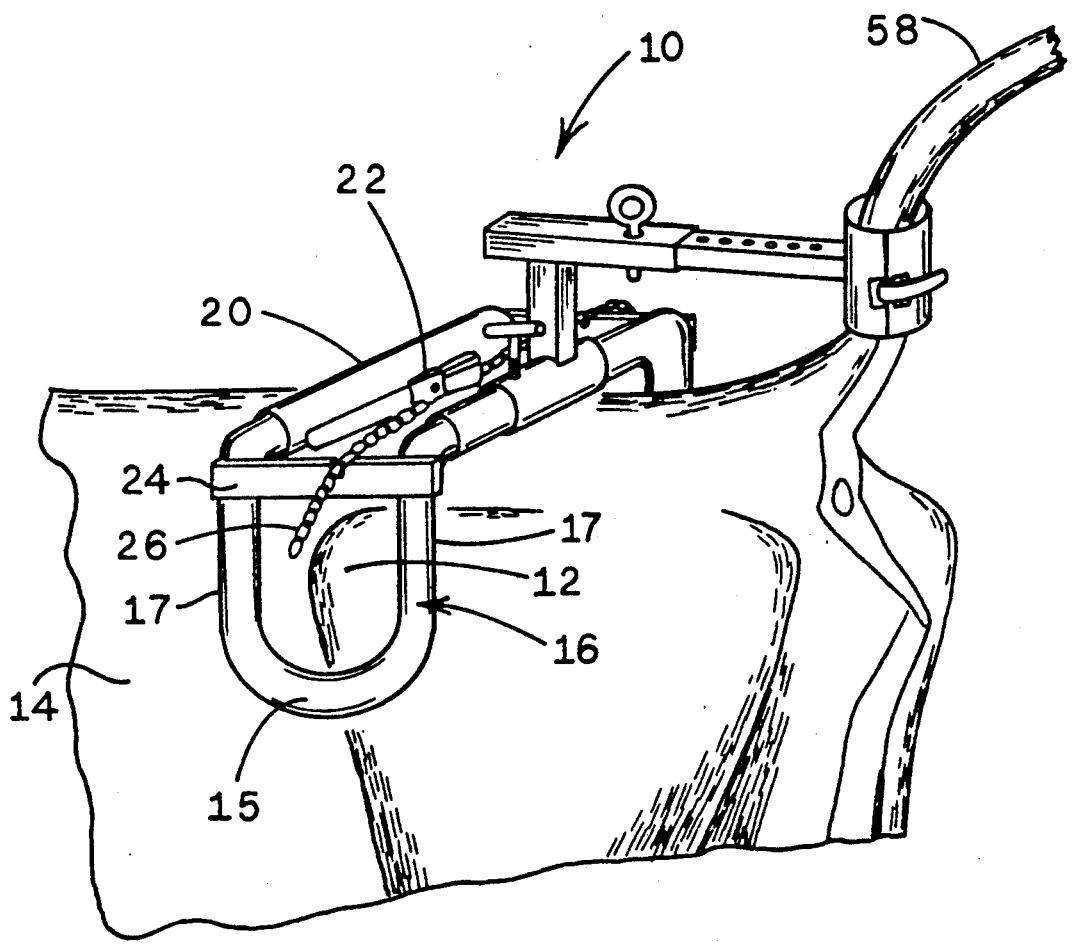
FIG. 1 shows a pictorial view of the apparatus of the invention in use on a cow.

FIG. 1 shows the anti-kick apparatus 10 of the invention installed over the hips 12 of a cow 14. The bottom 15 of a U-shaped clamp jaw 16 extends below the hip 12 of the cow, as seen especially in FIG. 1. A pair of legs 17 extend upwardly from bottom 15 and around the hip 12 of the cow. Connecting means 20 extend between the two jaws 16. A conventional chain tightener 22, comprising a chain 26 and, for example, a cam operated chain tightening means, extends between tie bars 24 which extend across the U-shaped clamping jaws between legs 17. Chain 26 of chain tightener 22 is anchored in notches 28 of tie bars 24, and is tightened by means of operating the cam tightening mechanism of the chain tightener. The chain tightener, including the chain, is conventionally available and, by itself, forms no part of this invention.

Figure 2:
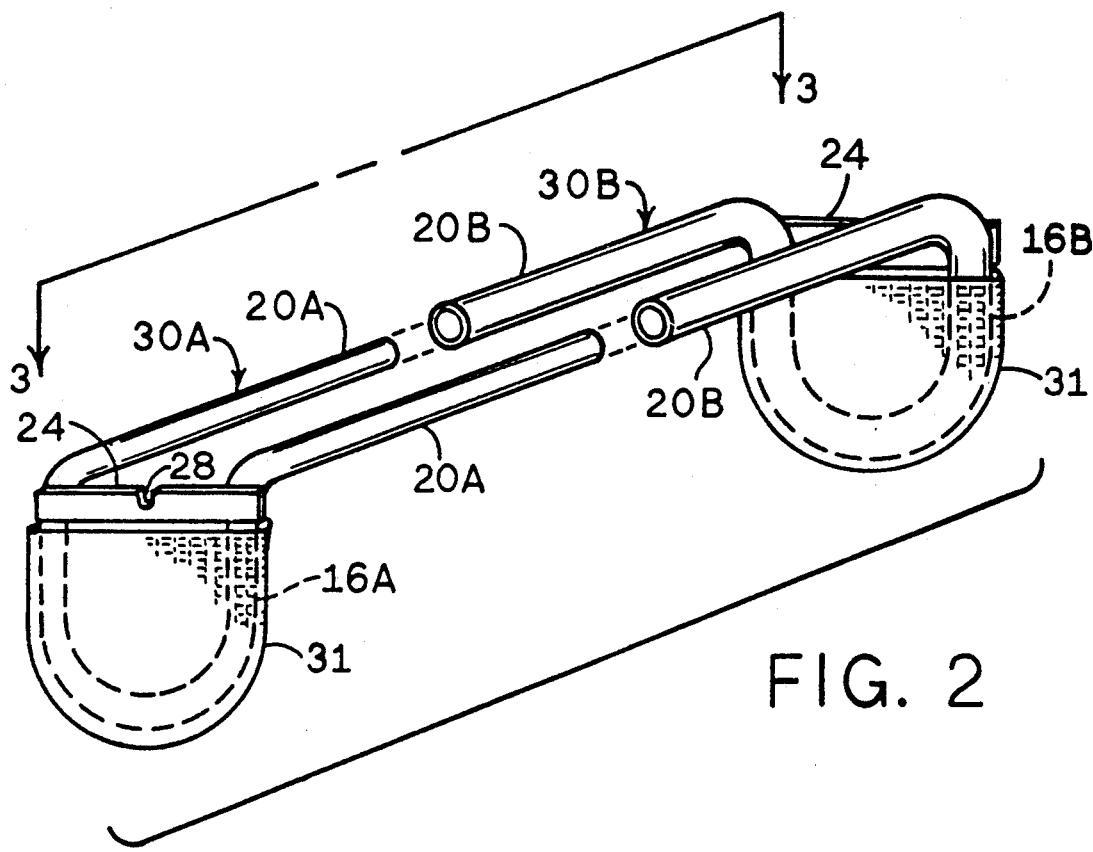
FIG. 2 shows a pictorial view of the first and second clamp members along with the telescoping relationship of the clamp members with respect to each other.

Turning now to FIG. 2, it is seen that the clamping mechanism comprises a pair of clamp members 30A and 30B. Clamp member 30A comprises a U-shaped clamping jaw 16A and a pair of clamp connecting members 20A which extend from the clamping jaw 16A at an angle to that first clamp jaw member, and preferably on approximately a perpendicular. The clamp connecting members 20A are generally parallel to each other.

A second clamp member 30B comprises a second U-shaped clamping jaw 16B and a second pair of clamp connecting members 20B which extend from the second clamp jaw member 16B at an angle to the second clamp jaw member and preferably on approximately a perpendicular. The clamp connecting members 20B are generally parallel to each other.

The second pair 20B of clamp connecting members is capable of slidable receiving the first pair 20A of clamp connecting members within itself. Typically, the clamp connecting members 20B are hollow tubes, whereby they are capable of receiving clamp connecting members 20A which are smaller in circumference. It is within the scope of the invention that both pairs of clamp connecting members 20A and 20B be hollow tubes. Clamping jaws 16A and 16B are preferably covered by socks 31, as seen in FIG. 2. Socks 31 are made from a flexible sheet material such as leather or a woven fabric. Socks 31 serve as a cushioning means between the respective clamping jaw 16 and the cow. Socks 31 also serve to provide an extended surface for surface-to-surface contact with the cow. Thus the socks increase the effective surface area over which the cow receives that clamping force of the clamping jaws. The increased surface area reduces the effective unit pressure and enhances the stability of the mount on the cow for a given tightening force on tightener 22.

Figure 3:
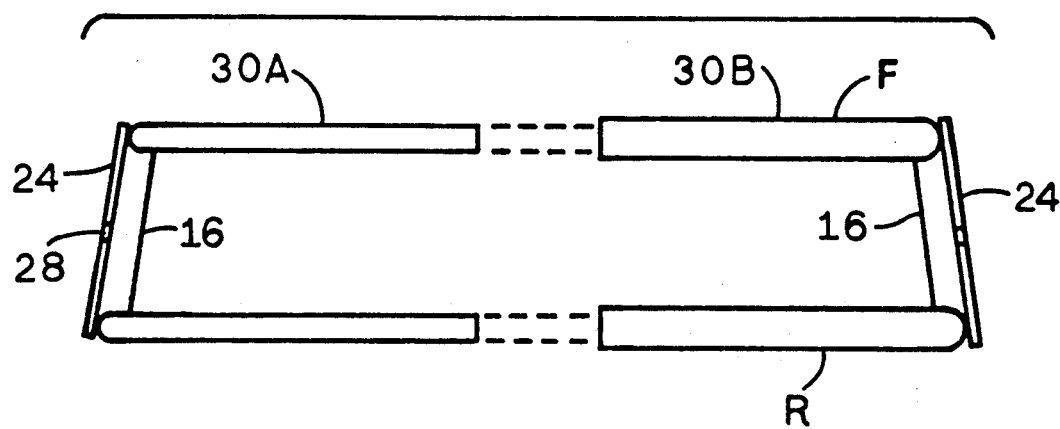
FIG. 3 shows a top view of the first and second clamp members and is taken at 3—3 of FIG. 2.

FIG. 3 shows a top view of the clamping means of FIG. 2, and especially shows that the clamping jaws are closer together at one end F of the clamping means, which is disposed toward the front of the cow, they are at the other end R of the clamping means, which is disposed towards the rear of the cow. This adaptation, which shows the clamping means as in FIG. 3 as a trapezoid, configures the clamping means for close conformity to the shape of the cow, which is narrower just forward of the hips than she is just rearwardly of the hips, about which the U-shaped clamping jaws clamp.

Figure 4:
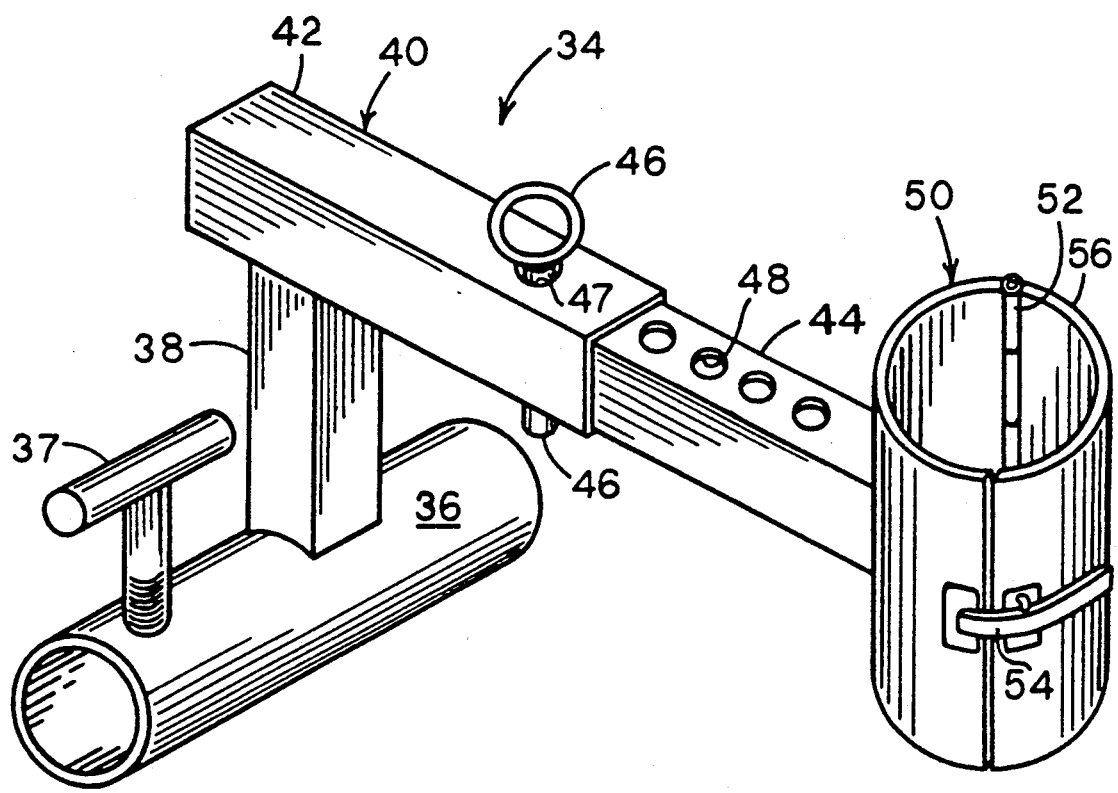
FIG. 4 shows a pictorial view of the tail holding means which is mounted on the second clamp member.

FIG. 4 shows the tail holding means 34. The tail holding means includes a mounting means 36 which is slidably and rotatably mountable to the connecting member 20B as seen in FIG. 1. Lock screw 37 extends through mounting means 36 and is tightened against connecting member 20B for temporarily securing the position of mounting means 36 with respect to connecting member 20B. Vertical support beam 38 extends upwardly from mounting means 36 to a generally horizontal tail support beam 40. Tail support beam 40 comprises an outer tail support beam 42 which slidably receives an inner support beam 44. Lock pin 46 extends through a pair of holes 47 in outer support beam 42 and through one of several pairs of holes 48 in upper and lower surfaces of lower support beam 44. The overall length of horizontal support beam 40 is determined by sliding the inner support beam 44 with respect to outer support beam 42 to the desired length of support beam 40 and then positioning locking pin 46 through the respective holes 47 and 48.

Tail holder 50 is positioned at the end of tail support beam 40 which is remote from vertical support beam 38. Tail holder 50 generally comprises a cylinder having a hinge 52 and a latch 54. The tail holder can be opened by releasing latch 54 and rotating the first cylinder half 56 with respect to hinge 52 whereby the tail holder is opened for receiving a tail 58 of a cow. Once the tail has been placed in the tail holder, the first cylinder half 56 is again rotated to the closed position shown in FIG. 4 and the latch 54 is latched.

The apparatus is assembled in the following manner. The tail holder mounting means 36 is slidably mounted over the second connecting member 20B by inserting the second connecting member 20B into the annulus described by mounting means 36. For ease of handling, the lock screw 37 can be tightened in order to provide unity to the subassembly at this time. The first connecting members 20A are then slidably inserted into the second connecting members 20B as indicated by the dashed lines connecting the connecting members in FIGS. 2 and 3. The disposition after insertion is shown in FIG. 1. The chain tightener 22 is then loosely installed on the clamp jaws, connecting to jaws 16A and 16B by way of notches 28. Latch 54 in tail holder 50 is released and first cylinder half 56 is swung open in preparation for receiving a cow's tail. With the anti-kick apparatus thus assembled, it is ready for use on a cow.

The anti-kick apparatus is positioned on the cow's back with the horizontal tail support beam disposed toward the cow's tail. In order for the apparatus to be securely mounted to the cow, it is critical that the clamp jaws 16 be placed about the hips 12 of the cow as seen in FIG. 1. Namely, the U-shaped clamping jaw pass below, to the front and to the rear of the hips 12 of the cow, which is a hard, bony structure. With the jaws 16 thus in place about the hips 12 of the cow, the chain tightener is tightened as shown in FIG. 1. Conventional length adjustment of the chain in the tightener is known and is practiced according to known techniques for first obtaining a snug assemblage of the chain followed by the cam operated tightening of the chain tightener. The chain tightener thus secures the mount of the apparatus to the cow by means of locking it to the cow's hips.

With the apparatus thus securely mounted to the cow, lock screw 37 is released, and the tail holding means 34 is centered with respect to the cow's tail and is rotatably positioned for holding the cow's tail in an upwardly directed attitude. With the tail holding means thus centered, and rotated for holding the tail in an upwardly directed attitude, the lock screw 37 is tightened, temporarily locking the tail holding means in position. The length of horizontal tail support beam 40 is then adjusted, as necessary, with respect to the length needed for use on any particular cow, by removing pin 46 and adjusting the length by sliding the inner support beam with respect to the outer support beam and reinserting the pin 46 through the appropriate holes 48 as well as holes 47. The tail 58 is then inserted into tail holder 50, and the cylinder half 56 is closed and latched at latch 54. After the tail has been inserted into the holder 50 and latch 54 has been securely latched, then lock screw 37 can be released as necessary and the entire tail holding means 34 rotated or slidably repositioned with respect to connecting member 20B in order to reposition the tail for a more advantageous hold and/or position. The lock screw 37 is then retightened whereby the anti-kick apparatus is in position and functional on the cow, and will prevent the cow from kicking under most circumstances.

The principal of operation of the apparatus of the invention is achieved where the tail of the cow is held in an upwardly directed attitude as seen in FIG. 1. It is important that the tail be held near its root, as opposed to being held near the end of the tail. While the root of the tail is thus held in an upwardly directed attitude, the cow will be effectively prevented from kicking under most circumstances. With the tail holding apparatus mounted to the cow itself, any movement of the cow relative to its surroundings does not put undue pressure on the tail by virtue of that movement. Rather, as the cow moves, the tail holding apparatus (anti-kick apparatus) moves with the cow. Thus, if the cow should fall, or if the cow should move in some other direction, the apparatus will not jerk or otherwise injure the tail.

Those skilled in the art will now see that certain modifications can be made to the apparatus herein disclosed with respect to the preferred embodiments, without departing from the spirit of the instant invention. And while the invention has been described above with respect to its preferred embodiments, it will be understood that the invention is capable of numerous rearrangements, modifications, and alternations, and all such arrangements, modifications and alternations, are intended to be within the scope of the appended claims.

Having thus described the invention, what is claimed is:

1. Anti-kick apparatus adapted to mount on the hips of a cow, said apparatus comprising:
    (a) first and second clamping jaws that receive and grip a cow's hips and thereby mount said apparatus to the cow;
    (b) connecting means connecting said clamping jaws to each other;
    (c) tail holding means mounted in said apparatus, and adapted to hold the tail of a cow in an upright position; and
    (d) tightening means extending between said first and second clamping jaws for tightening said first and second clamping jaws with respect to a cow's hips, said anti-lock apparatus, when mounted on the hips of a cow, and including said tail holding means, being adapted to move with the hips of the cow.

2. Anti-lock apparatus as in claim 1 wherein said connecting means comprises two connecting members, each said connecting member extending from said first clamping jaw to said second clamping jaws, said connecting members being spaced from each other.

3. Anti-lock apparatus as in claim 2, said apparatus comprising means for changing a distance between said clamping jaws.

4. Anti-lock apparatus as in claim 2 wherein said connecting members are spaced from each other, front-to-rear on the cow and wherein said tightening means is positoned between said connecting members.

5. Anti-lock apparatus as in claim 3 wherein said connecting members are spaced from each other, front-to-rear on the cow and wherein said tightening means is positioned between said connecting members.

6. Anti-lock apparatus as in claim 1 wherein said tail holding means comprises means for rotatably mounting said tail holding means to said connecting means and includes means for fixing said rotatable mounting means in a given rotational position.

7. Anti-lock apparatus as in claim 2 wherein said tail holding means comprises means for rotatably mounting said tail holding means to said connnecting means and includes means for fixing said rotatable mounting means in a given rotational position.

8. Anti-lock apparatus as in claim 3 wherein said tail holding means comprises means for rotatably mounting said tail holding means to said connecting means and includes means for fixing said rotatable mounting means in a given rotational position.

9. Anti-lock apparatus as in claim 1 wherein said tail holding means is slidable along the length of said connecting means and includes means of fixing said tail holding means at a given position along the length of said connecting means.

10. Anti-lock apparatus as in claim 2 wherein said tail holding means is slidable along the length of said connecting means and includes means for fixing said tail holding means at a given position along the length of said connecting means.

11. Anti-lock apparatus as in claim 3 wherein said tail holding means is slidable along the length of said connecting means and includes means for fixing said tail holding means at a given position along the length of said conecting means.

12. Anti-lock apparatus as in claim 4 wherein said tail holding means is slidable along the length of said connecting means and includes means for fixing said tail holding means at a given position along the length of said connecting means.

13. Anti-lock apparatus as in claim 5 wherein said tail holding means is slidable along the length of said connecting means and includes means for fixing said tail holding means at a given position along the length of said connecting means.

14. Anti-lock apparatus as in claim 6 wherein said tail holding means is slidable along the length of said connecting means and includes means for fixing said tail holding means at a given position along the length of said connecting means.

15. Anti-lock apparatus as in claim 7 wherein said tail holding means is slidable along the length of said connecting means and includes means for fixing said tail holding means at a given position along the length of said connecting means.

16. Anti-lock apparatus as in claim 8 wherein said tail holding means is slidable along the length of said connecting means and includes means for fixing said tail holding means at a given position along the length of said connecting means.

17. Anti-lock apparatus as in claim 1, said tail holding means comprising a support beam, said support beam comprising means for adjusting, and temporarily fixing, the length of said support beam.

18. Anti-lock apparatus as in claim 2, said tail holding means comprising a support beam. said support beam comprising means for adjusting, and temporarily fixing, the length of said support beam.

19. Anti-lock apparatus as in claim 3, said tail holding means comprising a support base, said support beam comprising means for adjusting, and temporarily fixing, the length of said support beam.

20. Anti-lock apparatus as in claim 4, said tail holding means comprising a support beam, said support beam comprising means for adjusting, and temporarily fixing, the length of said support beam.

21. Anti-lock apparatus as in claim 6, said tail holding means comprising a support beam, said support beam comprising means for adjusting, and temporarily fixing, the length of said support beam.

22. Anti-lock apparatus as in claim 9, said tail holding means comprising a support beam, said support beam comprising means for adjusting, and temporarily fixing, the length of said support beam.

23. Anti-lock apparatus adapted to mount on the hips of a cow, said apparatus comprising:
(a) first and second U-shaped clamping jaws, each said U-shaped clamping jaw comprising a bottom, and a pair of legs extending from said bottom, and including a tie bar extending between said legs;
(b) connecting means, comprising two pairs of telescoping members, wherein each said pair of telescoping members comprise a first tube member and a second member slidable inside said first tube member, said two pairs of telescoping members being spaced from each other, front and rear with respect to a cow;
(c) tail holding means mounted to said connecting means, said tail holding means comprising mounting means for rotatably and slidably mounting said tail holding means to said connecting means, and a support beam extending from said rotatable and slidable mounting means, said support beam comprising means for adjusting, and fixing, the length of said support beam, and a tail holder on said support beam remote from said rotatable and slidable mounting means; and
(d) tightening means extending between said tie bars on said first and second clamping jaws, for tightening said first and second clamping jaws in a direction toward each other.

24. Anti-lock apparatus as in claim 23, said clamping jaws being disposed such that portions of said clamping jaws which are closer to the front of the cow are closer together than portions of said clamping jaws which are closer to the rear of the cow.

25. Anti-lock apparatus adapted to mount on the hips of a cow, said apparatus comprising:
(a) a first clamp member comprising a first clamp jaw member, and a first pair of clamp connecting members extending from said first clamp jaw member at an angle to said first jaw member and generally parallel to each other;
(b) a second clamp member comprising a second clamp jaw member, and a second pair of clamp connecting members extending from said second clamp jaw member at an angle to said second jaw member and generally parallel to each other, said second pair of clamp connecting members slidably receiving, and joining with, said first pair of clamp connecting members;
(c) tightening means extending between said first and second clamp members, for tightening said first and second clamp members in a direction toward each other; and
(d) a tail holding meams rotatably and slidably mounted on one of said second pair of clamp connecting members, and including means for fixing said tail holding means in a given position on said one clamp connecting member, said tail holding means comprising means for said rotatable and slidable mounting, a support beam extending from said rotatable and slidable mounting, a support beam extending from said rotatable and slidable mounting means, said support beam comprising means for adjusting, and fixing, the length of said support beam, and a tail holder on said support beam remote from said rotatable and slidable mounting means.

26. A method of discouraging a cow from kicking, said method comprising the steps of:
(a) mounting onto a cow, at the cow's hips, apparatus comprising (i) first and second clamping jaws that receive and grip a cow's hips, (ii) connecting means connecting said clamping jaws, (iii) tail holding means mounted at a mounting locus in said apparatus and (iv) tightening means extending between said first and second clamping jaws, said mounting including tightening said tightening means, and thereby tightening the grip of said clamping jaws on the hips of the cow;
(b) slidably and rotatably fixing the position and rotational attitude of said tail holding means with respect to said mounting locus;
(c) attaching the tail of the cow, near the base of the tail, to said tail holding means; and
(d) adjusting said slidable and rotational positioning of said tail holding means, as necessary, to hold the tail of the cow in an upwardly directed attitude.

* * * * *